United States Patent [19]
Linderman

[11] 3,974,568
[45] Aug. 17, 1976

[54] DRIVERS LOG DEVICE

[76] Inventor: Gilbert I. Linderman, 524 Glendale Road, Glenview, Ill. 60025

[22] Filed: June 11, 1975

[21] Appl. No.: 586,027

[52] U.S. Cl. .......... 33/107 R; 33/75 R
[51] Int. Cl.[2] .......... B43L 7/00; G01B 3/10
[58] Field of Search .......... 33/75 R, 107 R; 116/135; 235/70 A, 70 B

[56] References Cited

UNITED STATES PATENTS

| | | | |
|---|---|---|---|
| 2,005,362 | 6/1935 | Clausen | 235/70 B |
| 2,456,676 | 12/1948 | Chowns | 33/107 R |
| 3,144,716 | 8/1964 | Cich | 33/107 R |
| 3,218,720 | 11/1965 | Curry | 33/107 R X |

*Primary Examiner*—Charles E. Phillips

[57] ABSTRACT

A device for assisting a truck driver in rapidly computing work hours from a log book, comprising a thin, flat, elongated plate of transparent material having a pair of indexing members movably mounted thereon for alignment with certain figures on a driver's daily time record.

2 Claims, 5 Drawing Figures

FIG. 1
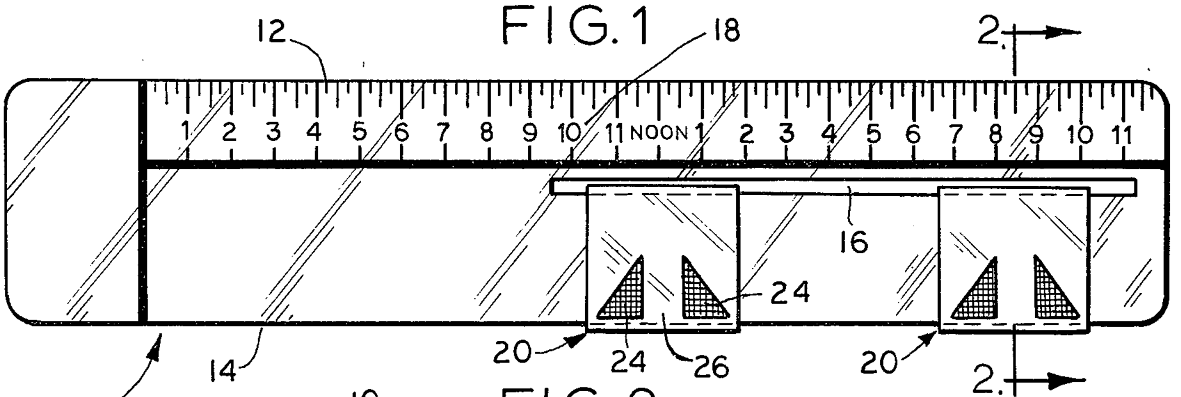
FIG. 2
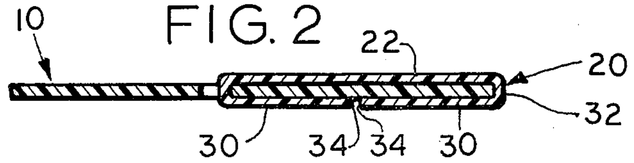
FIG. 3
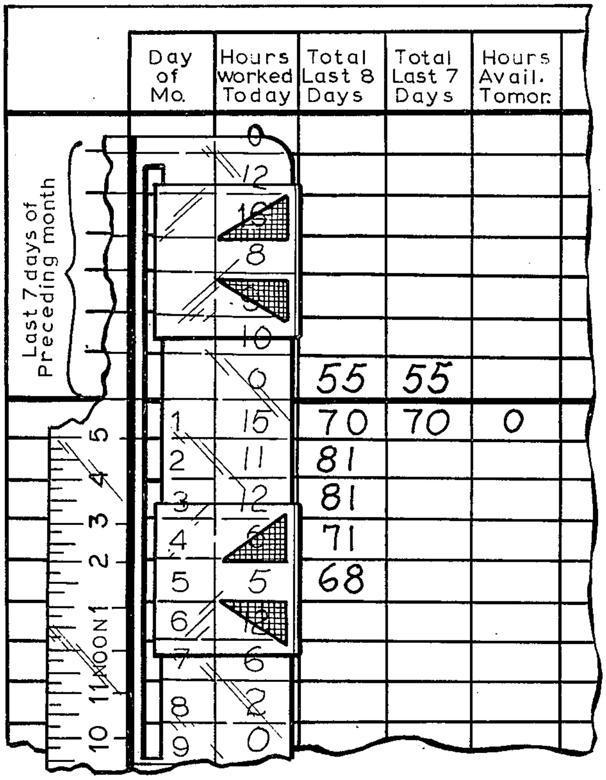
FIG. 4
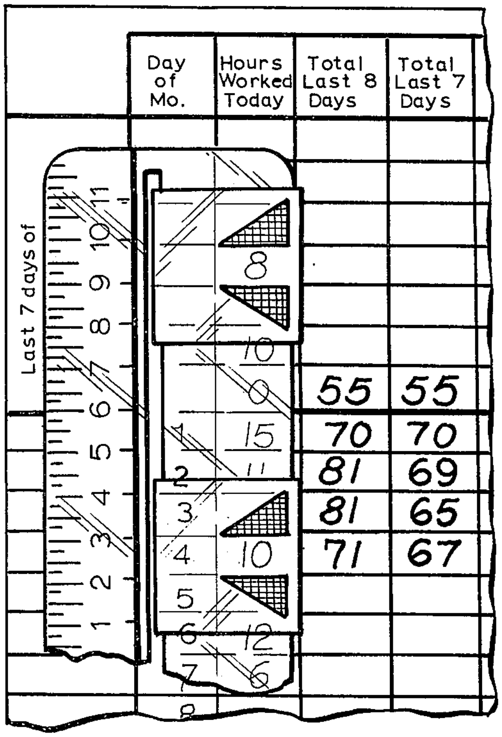
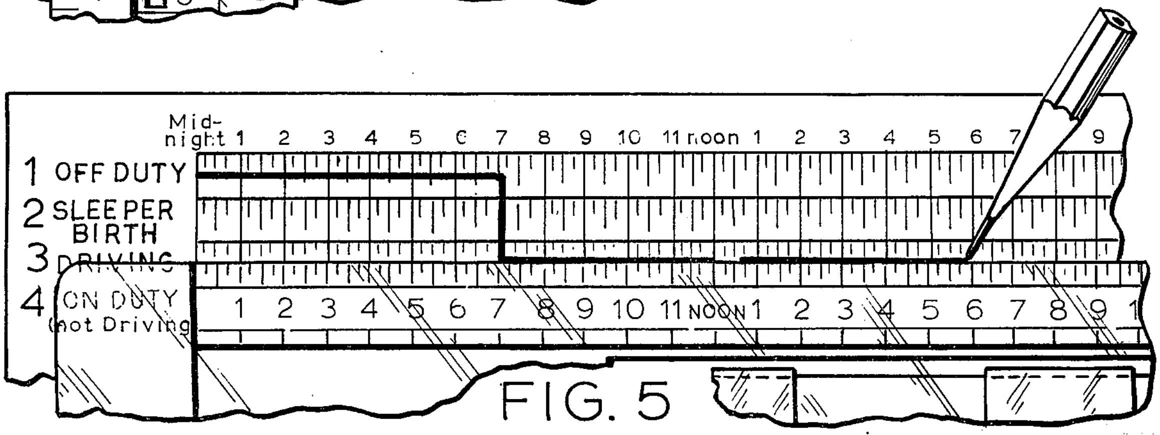
FIG. 5

DRIVERS LOG DEVICE

SUMMARY OF THE INVENTION

The invention relates to a device for use by drivers in calculating the number of hours worked over a period of time and the number of work hours available for a subsequent period of time in order to insure compliance with United States government regulations pertaining to driving periods.

For purposes of health and safety, the government has established maximum time periods for drivers, and particularly the over-the-road truck drivers. All such drivers are required to maintain a Drivers Daily Log chart listing, for each twenty-four hour period, the number of hours spent in the following catagories: Off Duty, Sleeper Berth, Driving, and On Duty (Not Driving).

Additionally, drivers are required to maintain a "Drivers Daily Record" which lists: the hours worked each day of the month, total hours worked last eight days, total hours worked last seven days, and hours available for next day. The purpose of this record is to enable a government inspector to check whether a driver has complied with the regulation which provides that a driver may not work over seventy hours in a eight-day period (or in some cases, sixty hours in a seven-day period). For illustrative purposes, the invention will be described in connection with the seventy hour/eight day rule, but it is equally applicable for any hour/day regulation.

The object of the invention is to provide a mechanical device of simple design and construction which is easy for a driver to use with his "Drivers Daily Record" form to calculate, without error, the number of hours worked in an eight-day period, the number of hours worked in a seven-day period, and the number of hours available for work the following or next day.

It is an object of the invention to provide a device of the type described which is in the form of a slide rule type arrangement and comprises an elongated base member and a pair of movable members slidably positioned thereon for alignment with charts or tables of varying spacing.

A more specific object of the invention is the provision of a device of the type described which includes an elongated base member having a slot therein extending parallel to one edge thereof and a pair of movable members slidably mounted thereon between said slot and said one edge thereof.

These and other objects of the invention will be apparent from an examination of the following description and drawings.

THE DRAWINGS

FIG. 1 is a plan view of a device embodying features of the invention;

FIG. 2 is a transverse, vertical section taken on line 2—2 of FIG. 1.

FIGS. 3 and 4 are fragmentary plan views illustrating the use of the device in connection with the Drivers Daily Record form; and FIG. 5 is a fragmentary plan view illustrating the manner in which the device is used in connection with the Drivers Daily Log form.

It will be understood that, for purposes of clarity, certain elements may have been intentionally omitted from certain views where they are believed to be illustrated to better advantage in other views.

Referring now to the drawings for a better understanding of the invention, it will be seen that a device embodying features of the invention is illustrated in FIG. 1.

The device includes a relatively thin, flat, narrow, elongated base member, indicated generally at 10, which may be formed from a transparent material such as plastic. Although the entire base member need not be transparent, it is essential that that portion of the base member lying between the slot therein and lower edge thereof, as hereinafter described, be transparent.

Base member 10 presents a pair of opposed upper and lower edges 12 and 14, respectively, which are smooth and uninterrupted and extend for the entire length of the base member.

Located between and extending parallel to edges 12 and 14 is a relatively narrow, elongated slot 16, the purpose of which is described later herein.

The area of the front surface of base member 10 which lies between upper edge 12 and slot 16 is printed with graduations or markings 18 denoting a twenty-four hour period, and the markings are scaled for alignment with corresponding markings on a Drivers Daily Log form, as illustrated in FIG. 5.

The purpose of the smooth upper edge 12 and the markings 18 is to assist a driver in drawing horizontal lines on the Daily Log form to indicate his status during all of the hours of each twenty-four hour period.

As best seen in FIGS. 1 and 2, a pair of indexing or slide members 20 are mounted for sliding movement longitudinally of base member 10 in the area between slot 16 and lower edge 14 of the base member.

Each of the slide members 20 is in the form of a band, which encompasses a portion of the base member, and includes a thin, flat upper section 22 overlying the front surface of base member 10 and having its upper and lower edges aligned with slot 16 and base member lower edge 14. Upper section 22 has printed thereon opaque markings 24 which outline or define a transparent area or aperature (not shown) 26, the purpose of which is described later herein.

Slide member 20 also includes a pair of thin, flat rear sections 32 which underlie the rear surface of base member 10. Rear sections 30 are co-planar and have their remote edges connected to related edges of upper section 22 by integral connecting sections 32. Rear sections 30 have their free edges 34 disposed immediately adjacent each other so that slide members 20 almost completely encircle or encompass the portion of base member 10 between slot 16 and lower edge 14 tightly enough to stay in a fixed position, but not so tightly that they cannot be easily moved from one desired position to another.

Now to describe the operation of the device, referring first to FIG. 4, it will be seen that a secondary but important function of the device is to serve as a ruler and guide to aid a driver in charting his time status for each twenty-four hour period on the Daily Log form. The reason slot 16 is provided to mount slide members 20 is to leave the upper edge 12 of base member 10 smooth and uninterrupted as a guide for a pencil or pen. The graduated markings 18 adjacent upper edge 12 assist the driver in aligning the device with the form and drawing the necessary horizontal lines between markings.

The primary function of the device, however, is to assist the driver in calculating the hours driven in the last or previous eight or seven day period of time. Referring now to FIG. 3, it will be seen that in the second column of the Drivers Daily Record form the number of hours worked for each day is entered. Once seven days have been entered, the total number is entered in the seventh line of the third column. In the example shown, the total number is seventy. Each day thereafter, the number of hours worked in last eight days (column 3) is changed by subtracting the number of hours worked the earliest day and adding the number of hours worked the latest day. This calculation is greatly simplified by the use of the device of the present invention. For example, as seen in FIG. 3, the slide members 20 of the device are moved so as to be spaced from each other a distance of eight lines on the form. Then to use the device, it is placed over the numbers of column 2, so that one slide member is over number 8 and the other is over the number 5. Since the earlier number 8 is 3 greater than the later number 5, the difference of 3 is subtracted from the total number in the preceding line of column 3, which is 71, making a new total of 68 hours. This same operation is performed each day, and each time if the upper exposed number is larger than the lower number, the difference is subtracted from the total, and if it is smaller, the difference is added to the total in Column 3.

The same principle is employed to determine the total number of hours worked in the last seven days for column 4. This is necessary to determine how many hours are available for the eighth day. To perform this operation, the slide members are spaced from each other a distance of seven days, with one slide member set at the first day and the other at the eighth day (seven days apart), and then the same type of computation is made by subtracting one number from the other and adding the difference to or subtracting it from the last number of column 4.

Thus, it will be seen that the invention provides a simple, inexpensive mechanism for aligning entries for comparison purposes to minimize the chance of error in computations.

I claim:

1. A device for assisting a driver in the comparison of spaced numbers for computation of hours worked during a specific number of days from a daily record form, comprising:

a. a relatively thin, flat, elongated base member formed of a transparent material and having:
   i. a pair of opposed, parallel, smooth, uninterrupted side edges extending substantially the entire length thereof;
   ii. a relatively narrow, elongated slot located between and extending parallel to said side edges for a distance which is less than the length of said base member;
b. a pair of indexing members mounted on said base member between said slot and one of said side edges for sliding movement relative to said base member and to each other;
c. each of said indexing members being in the form of a band snugly encompassing the base member between said slot and said one of said side edges and comcomprising:
   i. an upper section overlying said base member in facing engagement therewith and having opposed side edges aligned with said slot and said one side edge of said base member;
   ii. said upper section having a pair of spaced opaque markings defining a transparent area therebetween;
   iii. a pair of rear sections underlying said base member in facing engagement therewith;
   iv. a pair of integral, relatively narrow connecting sections extending through said slot and around said one side edge of the base member and interconnecting said front and rear sections;
d. the area of the upper surface of said base member which is located between said slot and said other edge thereof is provided with graduated markings thereon which are spaced for alignment with corresponding markings of a standard United States Department of Transportation Drivers Daily Log time sheet.

2. A device according to claim 1, wherein said rear sections have remote edges joined to said connecting sections and free edges spaced closely adjacent each other, so that said indexing member encompasses substantially all of that portion of said base member which is located between said slot and said one edge thereof.

* * * * *